Figures 1, 2:
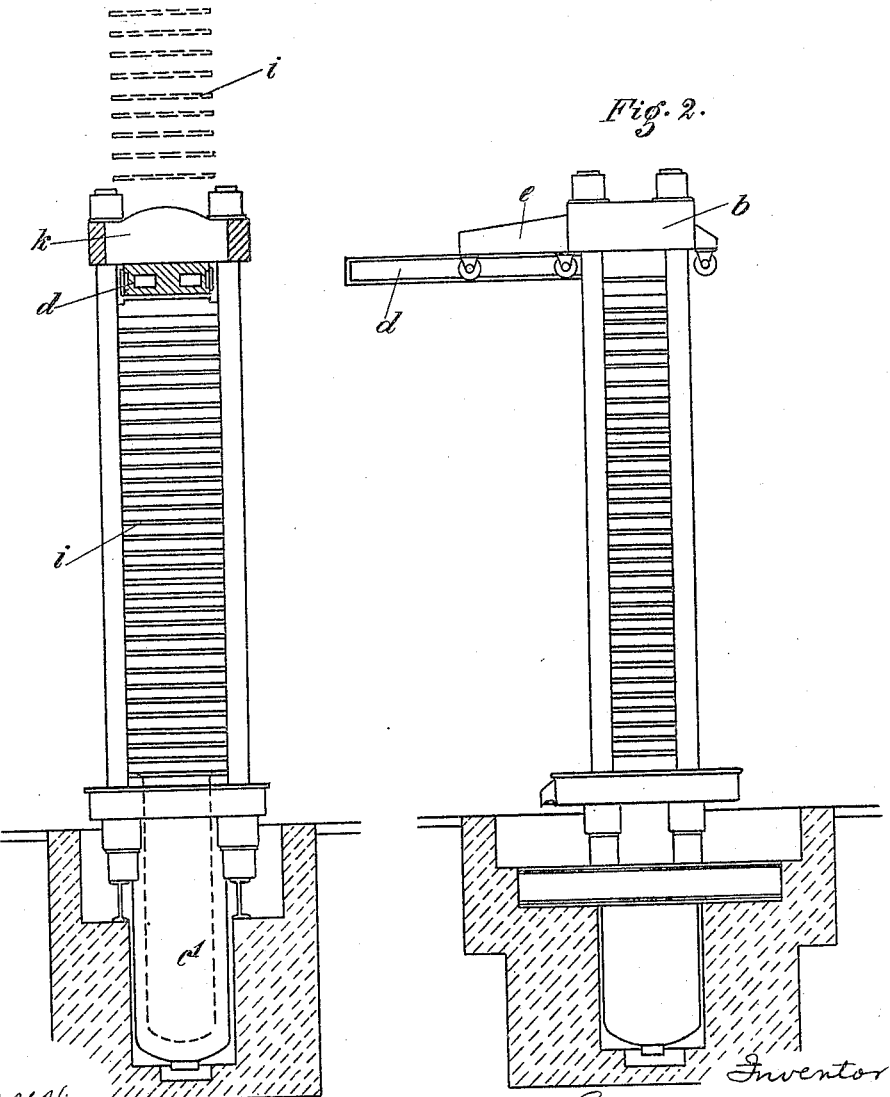

No. 818,265. PATENTED APR. 17, 1906.
G. KOEBER.
OIL PRESS.
APPLICATION FILED NOV. 30, 1904.

3 SHEETS—SHEET 1.

Witnesses:
Inventor:
German Koeber
by George Massie
Attorney

No. 818,265. PATENTED APR. 17, 1906.
G. KOEBER.
OIL PRESS.
APPLICATION FILED NOV. 30, 1904.
3 SHEETS—SHEET 2.
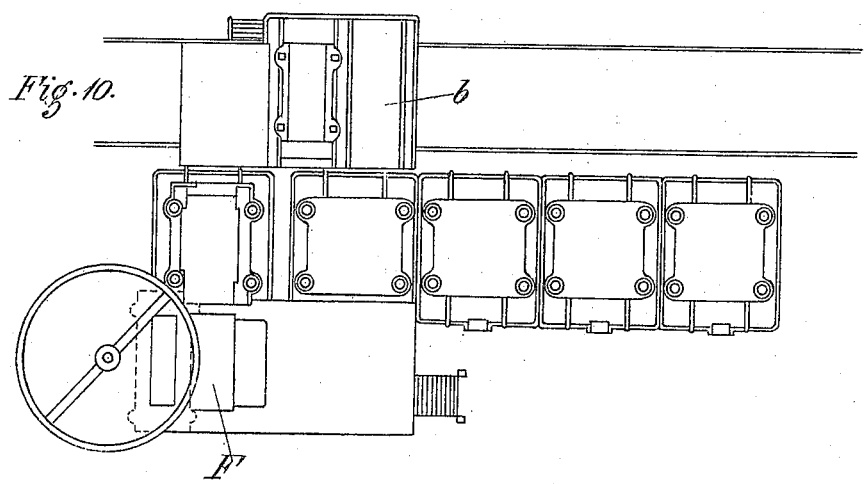
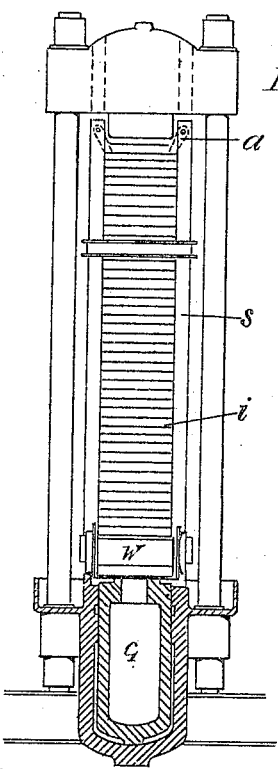
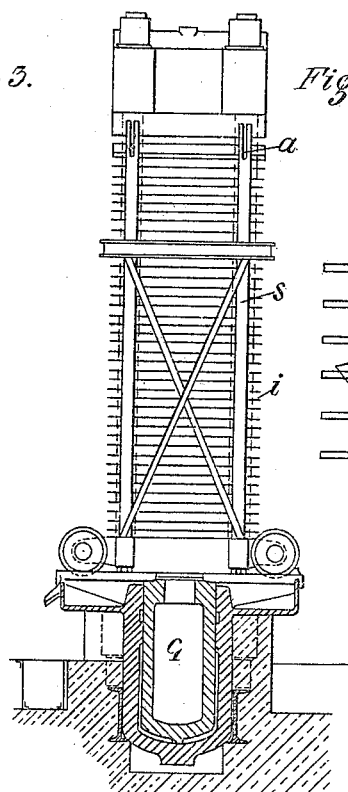
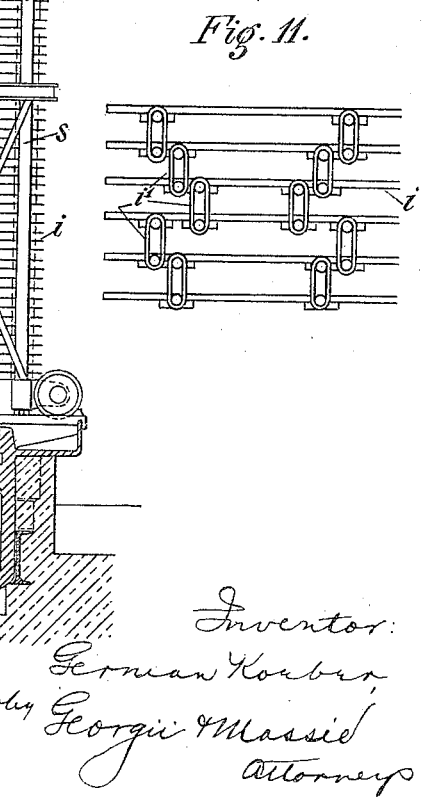
Witnesses:
E. O. Hildebrand
W. F. Anderson
Inventor:
German Koeber,
by Georgii & Massie
Attorneys

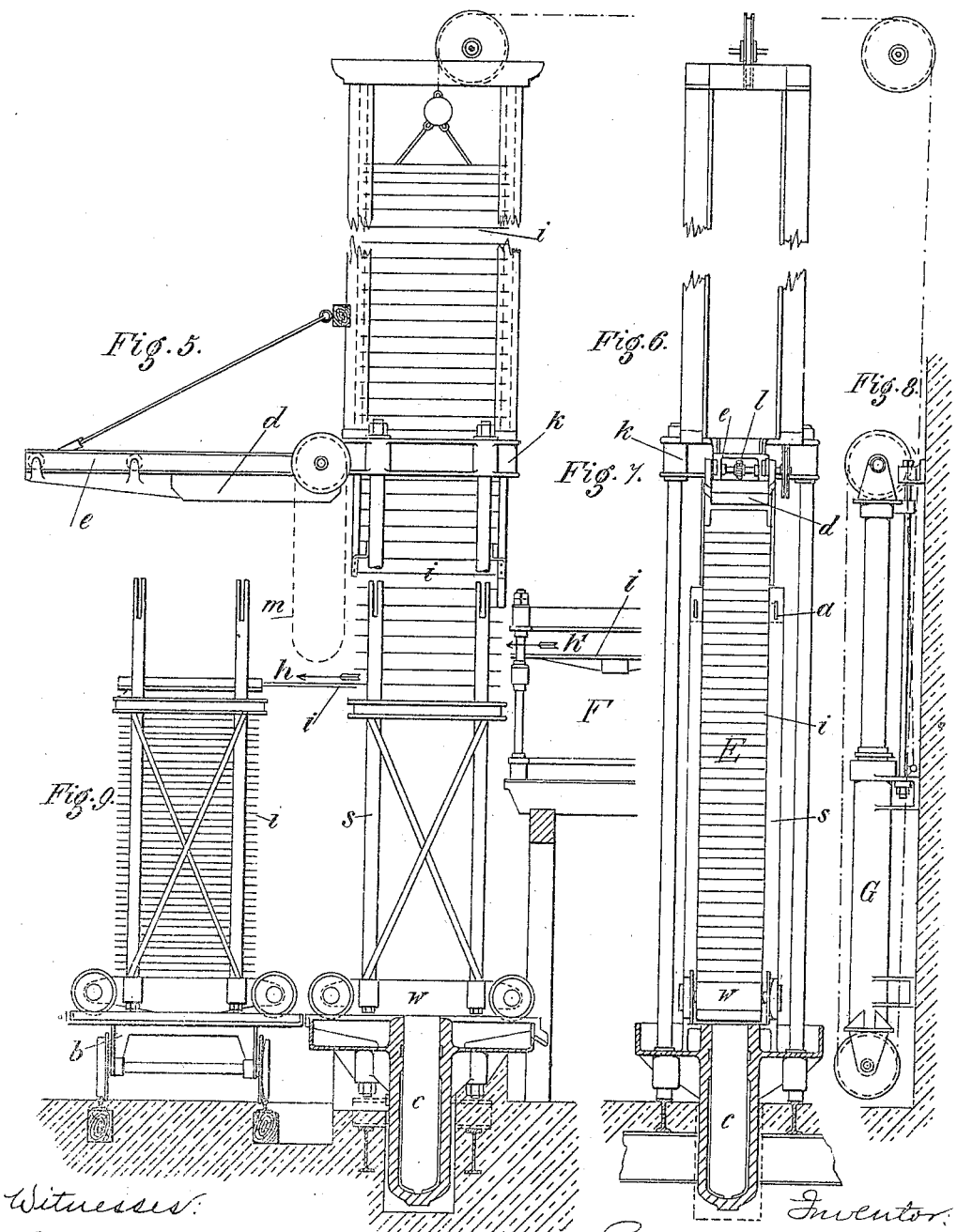

UNITED STATES PATENT OFFICE.

GERMAN KOEBER, OF HARBURG, NEAR HAMBURG, GERMANY.

OIL-PRESS.

No. 818,265.  Specification of Letters Patent.  Patented April 17, 1906.

Application filed November 30, 1904. Serial No. 234,969.

*To all whom it may concern:*

Be it known that I, GERMAN KOEBER, a citizen of Prussia, German Empire, residing at Harburg, near Hamburg, Germany, have invented certain new and useful Improvements in Oil-Presses; and I do hereby declare the following to be a full, clear, and exact description of the invention, such as will enable others skilled in the art to which it appertains to make and use the same.

The present invention relates to oil-presses of the class in which the cakes after pressing are removed by the press-boxes falling apart as the pressure-ram descends, when they are taken out by hand. These presses cannot generally be made much more than about six feet high; otherwise ladders or the like would have to be employed by the attendant to take out the upper cakes.

According to the present invention the feeding in and taking out of the cakes takes place at a constant height, and consequently the height of the press is not limited.

In order to render the present specification easily intelligible, reference is had to the accompanying drawings, in which similar letters of reference denote similar parts throughout the several views.

Figure 1 is a front, and Fig. 2 a side, elevation of one form of embodying the present invention. Figs. 3 and 4 are similar elevations with the pressure-ram shown in section. Fig. 5 is a side elevation with the boxes drawn out; and Fig. 6, a front elevation with the seed-packets down in position to be compressed to oil-cakes, the latter four figures showing a preliminary press. Fig. 7 is a part elevation showing the arrangement of the apparatus for forming the cakes previous to their being pressed to extract the oil. Fig. 8 is an elevation of the hydraulic lift for raising the boxes. Fig. 9 is a side elevation of a trolley device for carrying the cakes from the preliminary to the main press. Fig. 10 is a plan showing a general arrangement of several presses and the trolley, and Fig. 11 is a detail.

Referring to Figs. 1 and 2, the top plate of the press is made in the form of a frame $b$, through which the cakes may pass after they have been expressed, and within or below this frame is the actual pressure-plate $d$, which is adapted to be slid out laterally, as will be readily understood on reference to Fig. 2. After the pressure-ram $c'$ has completed the expression the plate $d$ is slid out laterally, and the top box of the stack, which has all its members connected together by means of links $i'$, Fig. 11, is attached to the chain or rope of a hydraulic lift or hauling device G, Fig. 8, the said chain passing from the pulley at the top of the piston round the lower pulley and up over suitable guide-pulleys and being attached to the top box of the stack of boxes $i$. As will be seen from Fig. 5, as the stack is drawn out each cake may be removed from its box $i$ at the level $h$, while a new packet or prepared form may be taken from the forming apparatus F and passed on to its box I at the level $h'$.

In the press shown in Figs. 1 and 2, which is a main press, the cakes may be taken out and fresh ones placed in as described; but in the press shown in Fig. 5, which is a preliminary one, the stack is advantageously compressed in a frame $s$, mounted on a trolley W, and the cakes are advantageously taken out and placed between a second set of boxes $i$ of a similar trolley-stack, Fig. 9, by means of which they may be easily conveyed to the main press by means of a second trolley $b$, as will be readily understood from Figs. 9 and 10.

After the stack of boxes has been drawn out and the cakes removed and the new ones placed in the same it is let down into the position shown in Fig. 6. The plate $d$ is run into the frame $k$ and the pressure-ram $c$ effects the preliminary pressing. The stack is then run onto the trolley $b$ and taken to the main or finishing press, in which the expression is completed. The stack is then raised by means of the hydraulic lift and the cakes removed, as hereinbefore explained, and new cakes placed in the stack. The plate $d$ may be moved laterally, either by means of a pinion-and-rack mechanism $l$, Fig. 6, or a chain-gearing $m$ and the hand-wheel shown in Fig. 5. The employment of double presses— *i. e.*, the preliminary and finishing presses— results in great economy of pressure-water in the main press.

I claim as my invention—

1. In an oil-press, means for moving the stack of boxes longitudinally and drawing them apart to enable the pressed cakes to be removed and fresh cakes to be inserted at constant heights.

2. In an oil-press, means for mechanically raising the stack of boxes bodily and drawing them apart after expression to bring the several boxes successively opposite a certain point to enable the pressed cakes to be taken out and fresh ones to be inserted.

3. In an oil-press, the combination, with a frame having a removable end plate, and a stack of boxes within the frame, of a hydraulic lift to raise the stack of plates after expression through the passage controlled by the removable plate.

4. In an oil-press, the combination, with a stack of boxes, a frame about said stack, and a pressure-plate arranged to fill out said frame, of means for removing the said plate laterally of the said frame, and means for raising the stack of plates through the free end of said frame.

5. In an oil-press, the combination, with a series of spaced boxes arranged in a stack, and links connecting the several boxes, of means for lifting the stack of boxes bodily and drawing them apart to enable the pressed cakes to be removed and fresh cakes inserted at constant heights.

6. In an oil-press, the combination, with a frame, a series of spaced boxes stacked within the frame, means connecting the boxes to allow of play, of a removable end plate to the frame, means for applying pressure to the stack at the opposite end from the movable plate, and means for moving the entire stack of boxes longitudinally within the frame and drawing the same apart to enable the pressed cakes to be removed and fresh cakes inserted at a uniform height.

7. In an oil-press, the combination, with a frame, a series of spaced boxes stacked within the frame, links connecting the boxes to allow of play, of a laterally-removable end plate at the top of the frame, means for applying pressure to the bottom of the stack, and means for lifting the entire stack of boxes and drawing the same apart to enable the pressed cakes to be removed and fresh cakes inserted at a uniform height.

8. In an oil-press, the combination, with a frame arranged to receive a stack of boxes containing cakes, a removable end plate closing one end of the frame, and means at the other end for applying pressure to the stack of boxes within the frame, of means for shifting the position of the stack to bring each box successively opposite a uniform point of discharge for the pressed cake and a uniform point for the reception of a fresh cake.

9. In an oil-press, the combination, with a frame arranged to receive a stack of boxes containing cakes, a removable end plate closing one end of the frame and means at the other end for applying pressure to the stack of boxes within the frame, of means for shifting the position of the frame and stack, and means for shifting the position of the stack longitudinally of the frame to bring each box successively opposite a uniform point of discharge for the pressed cake and a uniform point for the reception of a fresh cake.

10. In a plant for expressing oil, the combination, with a main press comprising a frame arranged to receive a stack of oil-cake boxes, means for applying pressure to the stack, and means for lifting the stack of boxes and drawing them apart to enable the pressed cakes to be removed and fresh cakes inserted at constant heights, of an auxiliary press, means for shifting the position of the stack of the auxiliary press to a point adjacent to the stack of the main press, and means for lifting the auxiliary stack and drawing the boxes apart to enable the preliminary pressed cakes to be transferred to the main stack.

In testimony whereof I affix my signature in presence of two witnesses.

GERMAN KOEBER

Witnesses:
ERNEST H. L. MUMMENHOFF,
I. CHRIST. HAFERMANN.